US005725713A

United States Patent [19]

Fischer

[11] Patent Number: 5,725,713

[45] Date of Patent: Mar. 10, 1998

[54] PAPER SHEETS OR WEBS WITH SEPARABLE SELF-ADHESIVE LABELS

[75] Inventor: Jules Fischer, Widen, Switzerland

[73] Assignee: Folien Fischer AG, Dottikon, Switzerland

[21] Appl. No.: 424,318

[22] PCT Filed: Aug. 17, 1994

[86] PCT No.: PCT/CH94/00162

§ 371 Date: Jun. 15, 1995

§ 102(e) Date: Jun. 15, 1995

[87] PCT Pub. No.: WO95/05281

PCT Pub. Date: Feb. 23, 1995

[30] Foreign Application Priority Data

Aug. 18, 1993 [CH] Switzerland ............................ 2466/93

[51] Int. Cl.$^6$ ........................................ B32B 31/00

[52] U.S. Cl. .......................... 156/247; 156/248; 156/250; 156/256; 156/261; 156/344; 156/510

[58] Field of Search ................................ 428/40, 41, 42, 428/192, 194, 213, 43; 283/81; 40/299, 340; 156/183, 247, 248, 250, 344, 510, 256, 261

[56] References Cited

U.S. PATENT DOCUMENTS

| | | | |
|---|---|---|---|
| 2,391,539 | 12/1945 | Avery | 428/42 |
| 4,246,058 | 1/1981 | Reed | 156/183 |
| 5,098,759 | 3/1992 | Felix | 428/40 |
| 5,580,640 | 12/1996 | Kraft | 428/41.8 |

FOREIGN PATENT DOCUMENTS

| | | |
|---|---|---|
| 0175719 | 4/1986 | European Pat. Off. . |
| 0342006 | 11/1989 | European Pat. Off. . |
| 3403363 | 8/1985 | Germany . |
| 865165 | 11/1959 | United Kingdom . |
| 2235176 | 2/1991 | United Kingdom . |
| 2235177 | 2/1991 | United Kingdom . |
| 04368 | 10/1985 | WIPO . |

OTHER PUBLICATIONS

Soviet Union Patent Document No. SU–979560, publication date Jul. 12, 1982 (Abstract).

*Primary Examiner*—Nasser Ahmad

*Attorney, Agent, or Firm*—Tarolli, Sundheim, Covell, Tummino & Szabo

[57] ABSTRACT

The present invention relates to a process for the production of paper sheets or webs (1) with self-adhesive labels (2) separable from the paper plane, in which to a running paper web (5) a contact adhesive application (4) and a separating paper (3) are applied at least in the vicinity of the labels (2) and during the passage of the paper web (5) through a punching device (9) the labels (2) are completely punched out of the paper web (5) prior to the application of the contact adhesive (4) and the separating paper (3), wherein the contact adhesive (4) is always applied together with and on the separating paper (3) to the paper web (5) and wherein the punched out labels (2) are fixed in the paper web (5) until their fixing is taken over by the separating paper (3) coated with the contact adhesive (4).

22 Claims, 2 Drawing Sheets

PAPER SHEETS OR WEBS WITH SEPARABLE SELF-ADHESIVE LABELS

BACKGROUND OF THE INVENTION

1. Field of the Invention

The present invention relates to paper sheets or webs with separable self-adhesive labels and in particular to a novel process for the production of such paper sheets or webs, in which, at least in the vicinity of the label, a contact adhesive and a separating paper is applied to a running paper web and the labels are punched out when the paper web passes through a punching device. Finally, the invention also relates to an apparatus for performing the process.

2. Description of the Related Art

EP-B1-175,719 discloses several processes for producing paper sheets or webs, particularly forms, with separable self-adhesive labels, which in the vicinity of the labels have an undesired, large thickness and/or in which the danger exists that, under heat and pressure action, contact adhesive will pass over and beyond the area of the labels into the surrounding marginal zone, which can lead to a sticking together.

Admittedly in the processes of EP-B1-175,719 these disadvantages are avoided. However, the labels are not completely punched out of the paper web and instead remain connected to the latter by means of weakening lines, such as e.g. perforations.

In a similar process, which is used in practice, in the vicinity of the labels initially a contact adhesive layer and separating paper portions are applied to a paper web. Only subsequently are the labels punched out, the paper web and the contact adhesive layer being punched through (wet punching through), but the separating paper on the back of the paper web is only prepunched. The labels remain fixed in the paper web, because the contact adhesive layer and the separating paper portions somewhat project over the surface of the labels on all sides. As the separating paper portions project over the contact adhesive layer on all sides, it is ensured that the contact adhesive does not pass out of the area of the separating paper and bring about a sticking together.

However, in the last-described process the prepunching is particularly problematical and difficult. The setting up and adjusting of the corresponding punching device is complicated and time-consuming and is also difficult to keep constant over a long period of time. In order to be able to carry out prepunching from the production standpoint, thicker and therefore more expensive separating papers must be used than would be necessary for the intended use per se. However, thicker separating papers more particularly lead to an increase in the overall thickness of the paper sheets or webs in the vicinity of the labels, which makes more difficult the handling thereof during stacking, reeling or inscribing.

The prepunching is made more difficult by the prior coating with the contact adhesive. The aqueous acrylic adhesive which is used in most cases wets the paper web, which leads to a reduction in the punching capacity. This can admittedly be avoided by a predrying, but the latter is expensive, energy-consuming and also endangers the flatness of the paper web. A laser printing run on the part of the customer can consequently be made more difficult or even impossible.

SUMMARY OF THE INVENTION

The main problem of the present invention is to provide a simple and economic process for producing paper sheets or webs with integrated, but completely punched out self-adhesive labels of the aforementioned type, which avoids the aforementioned disadvantages and can be performed using much thinner separating paper. In addition, an apparatus suitable for performing the process is to be provided.

Thus, in the process according to the invention the punching is a dry through punching, which is only performed on the paper web prior to the application of the contact adhesive and the separating paper. Only subsequently is the contact adhesive applied together with the separating paper to the paper web. The punched out labels, i.e. no longer connected to the paper web are fixed in the latter at their original location until this fixing is taken over by the separating paper coated with the contact adhesive.

Thus, in the process according to the invention no use is made of prepunching. According to the invention the punching out does not take place in the finished, so-called contact adhesive laminate, but instead by punching through solely in the paper web before the latter is brought together with the contact adhesive and the separating paper.

Therefore the process according to the invention makes it possible to produce self-adhesive labels on separating papers with much smaller thicknesses than hitherto. Thus, e.g. silicone papers can be reduced from the hitherto conventional 80 $g/m^2$ or at least 50 $g/m^2$ to only 30 $g/m^2$. The thickness of siliconized films can be reduced from 50 μ to 20 to 25 μ.

By means of the process according to the invention higher production speeds can be achieved and in particular the setting up times for the production machines are greatly reduced.

The fixing of the punched out labels in the paper web between punching out and the application of the contact adhesive or separating paper preferably takes place electrostatically or by vacuum and namely either on one of the cylinders of the punching device or an endless conveyor belt moving together with the paper web.

The separating paper is preferably drawn from a reel. The separating paper can be coated with the contact adhesive on the reel. However, the coating with the contact adhesive can also take place immediately prior to the application to the paper web.

The paper web can be laminated in whole-surface manner with the separating paper, which is advantageous if it is only wished to produce self-adhesive labels. However, prior to the application to the paper web the separating paper can be cut to the approximate size of the labels. This is recommended e.g. in the case of forms, which in a relatively large paper surface only contain individual, comparatively small labels.

According to the invention the contact adhesive is applied together with the separating paper. However, it must subsequently be joined so well to the label material that it adheres to the back of the label, when the latter is drawn off at the time of use. Following the removal of the label no contact adhesive must remain on the separating paper in the vicinity of the label. This so-called contact adhesive transfer can be assisted and sped up by exerting pressure on applying the separating paper. If the paper web, e.g. in a punching device with a rotating punching cylinder is deflected around the latter and the application of the separating paper also takes place on the punching cylinder, then the punch knives of the punching cylinder exert an increased pressure at the cut edges of the labels which, as explained, has a favourable influence on the contact adhesive transfer. However, the pressure exerted is much less than that during punching, so that there are no problems such as e.g. occur with prepunching.

The paper sheet or a corresponding paper web and having at least one separable label produced by means of the process according to the invention is characterized in the claims of the present invention, the claims of the present invention also illustrate a preferred embodiment with an extremely thin and only very slightly bulky separating paper. It is a characteristic thereof that the separating paper and the contact adhesive application have no punching tracks.

BRIEF DESCRIPTION OF THE DRAWINGS

The invention is described in greater detail hereinafter in conjunction with embodiments and the attached drawings.

DESCRIPTION OF THE PREFERRED EMBODIMENT

Figures 1A, 1B, 1C:
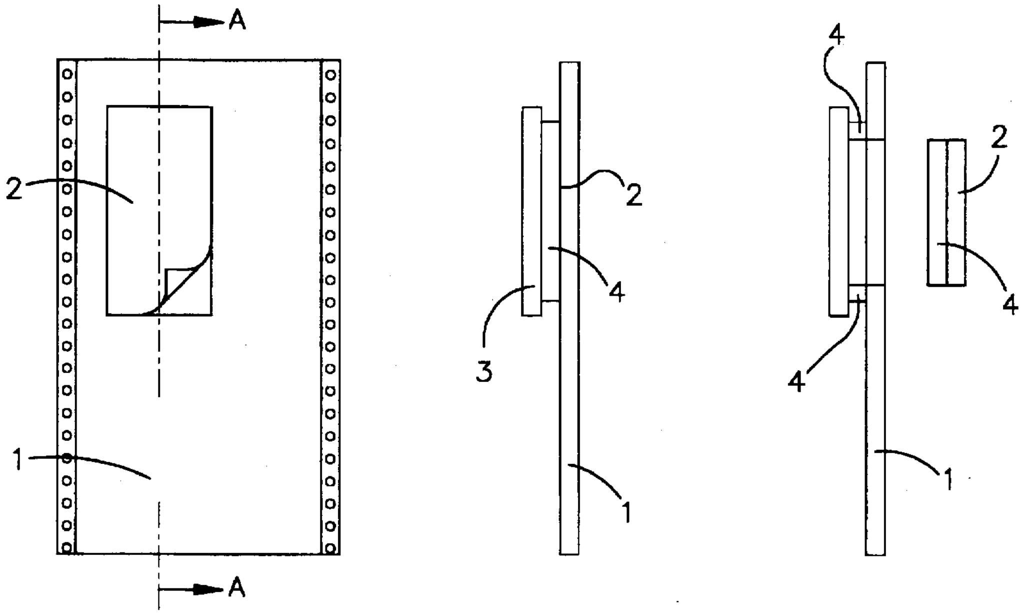
FIG. 1 shows a single paper sheet or a form with a separable self-adhesive label in plan view and in two sections.

Reference is firstly made to FIG. 1, which shows under a) a paper material form 1 having a marginal hole system and a label 2 separable therefrom. As can be seen in the sectional representation under b) (section A—A in FIG. 1*a*), the label 2 is fixed in the form 1 by a separating paper portion 3 projecting marginally over all sides of the label 2 and stuck to the back of the form. There is a contact adhesive layer 4 in FIG. 1, which also projects marginally at all sides over the label, but has a surface which is somewhat smaller than that of the separating paper piece 3. The contact adhesive of the contact adhesive layer 4 has on the paper of the form 1 or the label 2 a greater adhesion than on the separating paper 3. The contact adhesive layer on the back of the label 2 is consequently detached together with the label during the detachment of the latter from the separating paper 3, as is shown in FIG. 1*c*.

Figure 2:
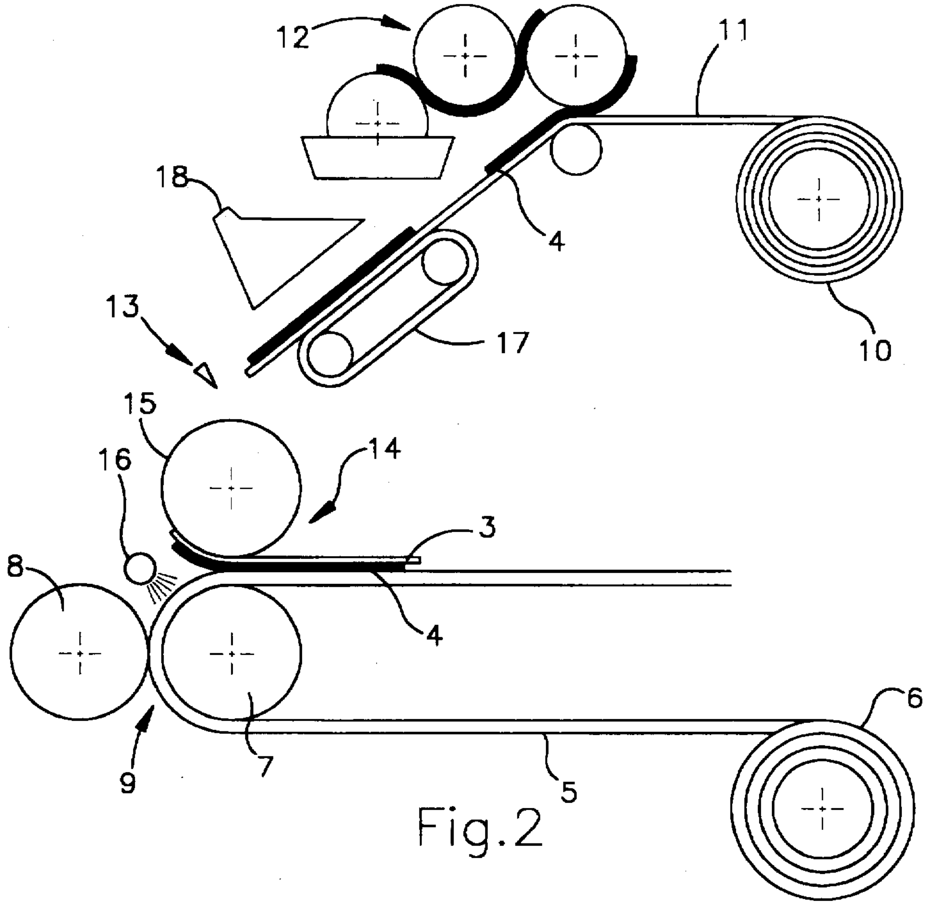
FIGS. 2 to 4 show three different apparatuses for performing the process of the invention for producing such sheets or forms in three different variants. In the drawings coinciding parts are given the same reference numerals.

In the apparatus according to FIG. 2 the paper web 5 passes from a reel 6 initially between a punching cylinder 7 and a countercylinder 8 of a punching device 9. The desired labels 2 are thereby punched out of the paper web 5. After punching the labels 2 no longer have any connection with the paper web 5. From a further reel 10 is drawn a separating paper web 11 (e.g. a silicone paper or also a separating film) and is selectively coated with a contact adhesive 4 in a coating station 12. By means of a cutting device 13 individual separating paper portions 3 coated with the contact adhesive are cut from the separating paper web 11. The coated separating paper portions 3 are then laminated in a laminating device 14 onto the paper web 5 in the vicinity of the labels 2. The laminating device 14 here comprises on one side the aforementioned punching cylinder 7 of the punching device 9 and also a laminating cylinder 15.

So that the labels 2 punched out of the paper web 5 during the passage between the punching cylinder 7 and the countercylinder 8 remain at their original position in the paper web 5 during the further movement thereof until they are fixed there by the laminated on separating paper portions 3, they are temporarily fixed on the punching cylinder 7. For this purpose the paper web 5 is deflected around the same. After approximately a quarter rotation on the punching cylinder 5 the separating paper portions 3 are supplied over the laminating cylinder 15. The punching cylinder 7 fulfils the further function of acting as a counterpressure cylinder during the lamination process. The brief fixing to the punching cylinder 7 in particular takes place electrostatically, the static electricity for this being produced by means of the elements 16. For vacuum fixing the punching cylinder would have to be provided with vacuum suction holes of approximately 1 to 3 mm diameter, which are periodically controlled for suction and release.

In the example of FIG. 2 the paper web 5 is deflected by 180° round the punching cylinder 7. However, fundamentally it would be sufficient to have a smaller deflection angle, the latter depending on the size of the labels and the diameter of the punching cylinder.

The deflection of the paper web 5 and the fixing of the labels 2 could also take place round or on the countercylinder 8. The use of the punching cylinder 7 offers the advantage that at the instant of laminating on the coated separating paper portions 3, the knife edges of the punching cylinder bring about a certain additional laminating pressure in the marginal area of the labels, which has a favourable effect on the transfer of the contact adhesive from the separating paper to the labels.

In FIG. 2 17 designates an endless conveyor belt for the supply of the separating paper web 11, whilst 18 is a drying device for the contact adhesive application to the separating paper web 11. The endless conveyor belt 17 is preferably so controlled relative to the movement of the paper web 5, that the separating paper portions 3 come to rest in a precisely correct manner on the same in the vicinity of the punched out labels 2.

Figure 3:
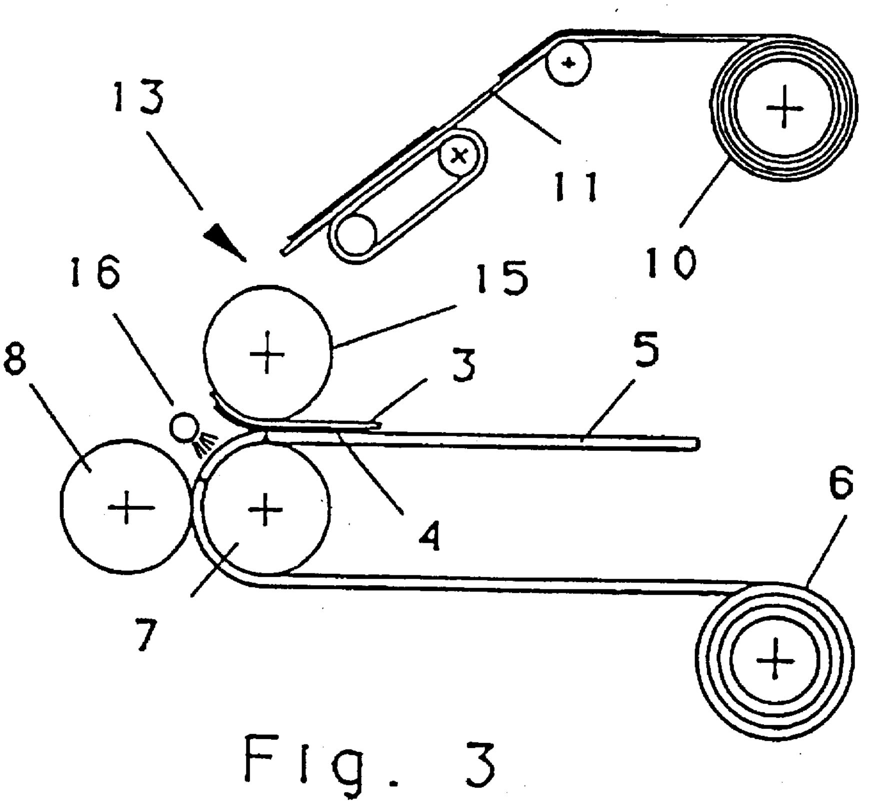

In the case of the apparatus of FIG. 3 there is no coating station 12 and drying device 18, because here the separating paper web is already coated with contact adhesive 4 on the reel 10. The contact adhesive coating is not continuous and is instead, as in FIG. 2, selectively interrupted. Thus, on the forms, the separating paper portions 3 can project surfacewise somewhat over the contact adhesive layers. In addition, the cutting device 13 does not also have to cut through the contact adhesive. Otherwise there are no differences between FIGS. 2 and 3.

Figure 4:
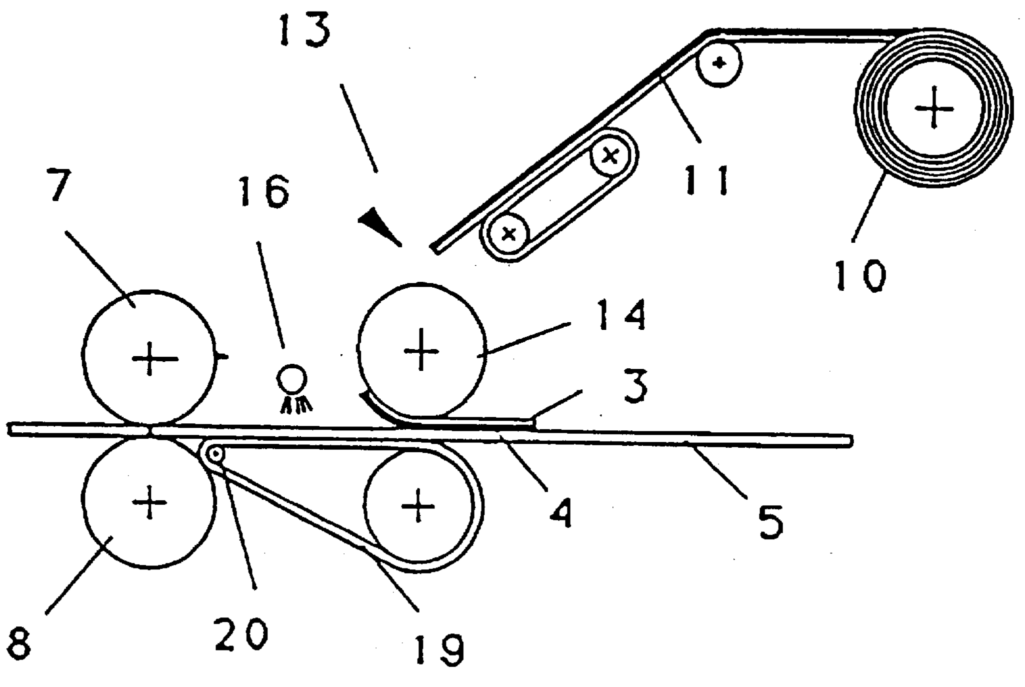

In FIG. 4 the temporary fixing of the labels 2 does not take place to the cylinder of the punching device 9, but to an endless conveyor belt 19 especially provided for this purpose. The latter is deflected on the cylinder 8 of the punching device round a reel 20 having a very small diameter compared with the cylinder 8, so as to be able to take over the labels 2 for as long as they have not yet been completely punched out of the paper web. The distance between the reel 20 and the bottleneck between the two cylinders 7,8 of the punching device 9 should be smaller than the extension of the labels 2 in the longitudinal direction of the paper web 5. Once again the labels are fixed to the endless conveyor belt 19 electrostatically. Also in FIG. 4 the separating paper web is precoated with contact adhesive on the reel 10. The contact adhesive application is in this case continuous and does not have any gaps as in the case of FIG. 3.

The apparatuses according to FIGS. 2 and 3 could naturally also be operated with a continuous contact adhesive application to the separating paper web.

Finally, for producing individual sheets or forms from the paper web 5, they would naturally also have to be trimmed, but this is not shown in the drawings. However, the paper web can also be left unchanged.

I claim:

1. A process for the production of a paper sheet or web (1) with self-adhesive labels (2) separable from the paper web, the process comprising the steps of:

providing a paper web (5);

passing the paper web (5) through a punching device (9), punching labels (2) from the paper web wherein the punching is a punching through the web and completely around the periphery of the labels such that the labels are free of any connection with the paper web after the paper web passes through the punching device;

applying contact adhesive (4) together with and on separating paper (3) to the paper web (5) adjacent the labels (2) and to the labels, thereby producing a paper web with labels adhered therto by the contact adhesive;

wherein the application of the contact adhesive (4) together with and on the separating paper (3) to the paper web (5) and the labels is performed only after the labels (2) have been punched out of the web and wherein the punched out labels are held and fixed in position in the paper web until the labels are adhered to the paper web by the separating paper coated with the contact adhesive.

2. Process according to claim 1, wherein the punching device (9) comprises a rotary punching cylinder (7) and a rotary countercylinder (8), wherein when the paper web (5) passes between the two cylinders (7,8) the label is punched out and subsequently deflected around one of the two cylinders (7,8) and wherein the fixing of the punched out labels (2) in the paper web (5) takes place on said cylinder (7,8).

3. Process according to claim 2, wherein the paper web (5) is deflected round the punching cylinder (7).

4. Process according to claim 1, wherein the fixing of the punched out labels (2) takes place on an endless conveyor belt (19) moved together with the paper web (5).

5. Process according to claim 1, wherein the fixing of the punched out labels takes place electrostatically.

6. Process according to claim 1, wherein the fixing of the punched out labels takes place by vacuum.

7. Process according to claim 1, wherein the separating paper (3) is drawn as endless material from a reel (10), cut to size and applied in individual portion manner to the paper web (5).

8. Process according to claim 1, wherein the separating paper is only provided with the contact adhesive application (4) immediately prior to the application to the paper web (5).

9. Process according to claim 7, wherein the separating paper (3) is coated with the contact adhesive on the reel (10).

10. Process according to claim 1 wherein the contact adhesive is an acrylic transfer adhesive.

11. Apparatus for performing the process according to claim 1 with means (7,8) for the complete punching out of labels (2) from a running paper web (5) and dispersing means (14) for applying a contact adhesive (4) and separating paper (3) to the paper web (5), wherein the means for punching out are positioned upstream of the dispensing means (14) in the running direction of the paper web (5) and between the punching out means (7,8) and the dispensing means (14) are provided means (7,16,19,20) for the temporary fixing of the labels (2) punched out with the punching out means (7,8) in the paper web (5).

12. Apparatus according to claim 11, wherein the punching out means (7,8) comprise a punching cylinder (7) cooperating with a countercylinder (8) and wherein the punching cylinder (7) or the countercylinder (8) is part of both the fixing means and the dispensing means (14) and the paper web (5) is partly deflected around the same.

13. Apparatus according to claim 12, wherein the punching cylinder (7) is part of the fixing means and dispensing means (14).

14. Apparatus according to claim 11, wherein the fixing means comprise an endless conveyer belt (19) moving with the paper web.

15. Apparatus according to claim 11, wherein the fixing means are electrostatic means.

16. Apparatus according to claim 11, wherein the fixing means are vacuum means.

17. Apparatus according to claim 11, wherein the dispensing means (14) comprise means for drawing off the separating paper as an endless web (11) from a reel (10), means (13) for cutting to size individual separating paper portions from the endless web (11) and a laminating cylinder (15).

18. Apparatus according to claim 11, wherein the dispensing means (14) comprise means (12,18) for the wet coating of the separating paper (3) with the contact adhesive (4).

19. A process for the production of a web with self adhesive labels which are separable from the web, said process comprising:

providing a web;

forming at least one label in the web, the label being free of any connection with the web;

holding the label in the web after forming the label; and fixing the label to the web after the forming step by adhering a separating material to the web and the label by contact adhesive which has a greater adhesion to the label and the web than to the separating material.

20. The process of claim 19 wherein the step of holding the label in the web comprises temporarily holding the label in the web until the contact adhesive fixes the label and the separating material to the web.

21. The process of claim 20 wherein the step of temporarily holding the label in the web takes place electrostatically.

22. The process of claim 19 wherein the contact adhesive is adhered to the separating material prior to the separating material being adhered to the web and the label by the contact adhesive.

* * * * *